United States Patent
Dzus, Jr.

[15] 3,656,466
[45] Apr. 18, 1972

[54] FASTENER ELEMENT AND ASSEMBLY
[72] Inventor: Theodore Dzus, Jr., West Islip, N.Y.
[73] Assignee: Dzus Fastener Co., Inc., West Islip, N.Y.
[22] Filed: Jan. 28, 1971
[21] Appl. No.: 110,529

Related U.S. Application Data

[63] Continuation-in-part of Ser. No. 850,399, Aug. 15, 1969, abandoned.

[52] U.S. Cl. ......................................123/198 E, 24/221 A
[51] Int. Cl. ..........................................................A44b 17/00
[58] Field of Search .................................................26/221 A

[56] References Cited

UNITED STATES PATENTS 3,584,350   6/1971   Schenk..............................24/221 K

FOREIGN PATENTS OR APPLICATIONS 786,644   11/1957   Great Britain...........................24/221

Primary Examiner—Bernard A. Gelak
Attorney—Kane, Dalsimer, Kane, Sullivan & Kurucz

[57] ABSTRACT

A fastener element adaptable for use with a stud shank element. One of the elements is provided with a spiral cam slot and the other of tee elements is provided with a pin mounted thereon. The fastener element includes a sleeve and a housing movably positioned in the sleeve. The pin extends diametrically across one of the elements and is supported by that element. A spring is mounted in the sleeve and abuts the housing so that when the sleeve is positioned about the stud shank and the housing compressively engages the spring while the fastener element is axially rotated, the position of the pin within the cam slot will be shifted to couple the fastener element and shank together.

16 Claims, 7 Drawing Figures

PATENTED APR 18 1972 3,656,466

INVENTOR
THEODORE DZUS, JR.
BY
Kane, Dalsimer, Kane, Sullivan + Kurucz
ATTORNEYS INVENTOR
THEODORE DZUS, JR.
BY
Kane, Dalsimer, Kane, Sullivan + Kurucz
ATTORNEYS

FASTENER ELEMENT AND ASSEMBLY

REFERENCE TO RELATED APPLICATION

This application is a continuation-in-part of my previously filed application Ser. No. 850,399 filed Aug. 15, 1969, now abandoned, and incorporates by reference the subject matter contained therein.

BACKGROUND OF THE INVENTION

This invention relates to a fastener element and, more particularly, to a fastener element for detachably fastening covers, panel members and the like. One such beneficial use is in detachably fastening a valve cover to an engine block.

At the present time, a typical internal combustion engine for automobiles and the like includes a valve cover for mounting on the engine block. The valve cover is fastened to the block by means of threaded bolts tightened under a predetermined torque. The removal of the valve cover from the engine block has always involved a considerable amount of time and effort on the part of the automobile mechanic and especially the amateur automobile enthusiast. In addition, the replacement of the valve cover on the engine block presents problems in alignment of the sealing gasket on many types of internal combustion engines.

BRIEF SUMMARY

A fastener element and assembly has not been developed which is adaptable for use in detachably coupling a valve cover to an engine block and which dispenses with many of the problems associated with bolted valve covers.

An object of this invention is to provide a fastener element and assembly for detachably fastening separate members.

Another object of this invention is to provide a fastener element and assembly which will serve in coupling a valve cover to an engine block.

Other objects and advantages will become apparent from the following description taken in conjunction with the accompanying drawings in which.

DESCRIPTION OF THE INVENTION

In accordance with this invention, a fastener element is provided which is adaptable for use with a stud shank element. One of the elements has a spiral cam slot and the other of the elements has a pin mounted thereon. The fastener element includes a sleeve and a housing movably positioned in the sleeve. The pin extends diametrically across one of the elements and is supported thereby. A spring is mounted in the sleeve and abuts the housing so that when the sleeve is positioned about the stud shank and the housing compressively engages the spring while the fastener element is axially rotated, the position of the pin within the cam slot will be shifted to couple the fastener element and shank together.

PREFERRED EMBODIMENT

Figure 1:
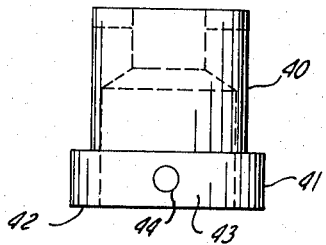
FIG. 1 is an exploded view of the fastener element and assembly.
Figure 1:
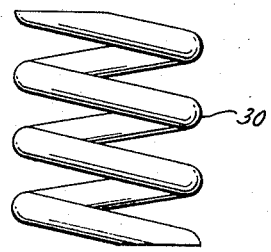
Figure 1:
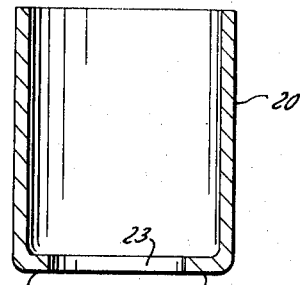
Figure 1:
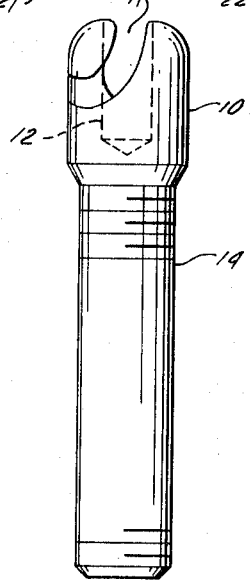

Referring now to the drawings, FIG. 1 shows fastener element assembly composed of sleeve 20, spring 30 and housing 40. Stud shank 10 is provided with bore 12, spiral cam slot 11 and a threaded section 14 for mounting in an engine block. Sleeve 20 having shoulders 21 and 22 is provided with an opening 23 to accommodate shank 10. Coil spring 30 is mounted in sleeve 10 and abuts shoulders 41 and 42 of housing 40. Pin 44 is rigidly mounted in housing 40 and extends diametrically across hollow 43.

Figure 2:
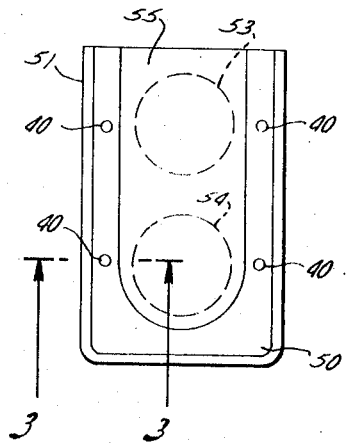
FIG. 2 is a cutaway top plan view of the valve cover coupled to an automobile engine block by means of the fastener element and assembly.
Figure 5:
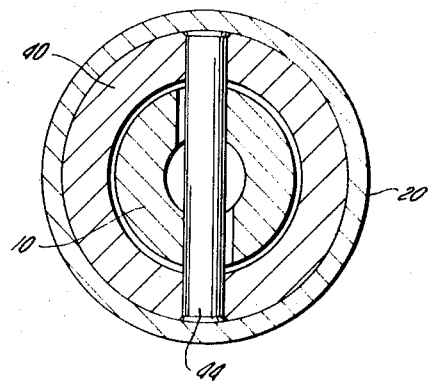
FIG. 5 is a horizontal sectional view taken along the line 5—5 of FIG. 3.
Figure 4:
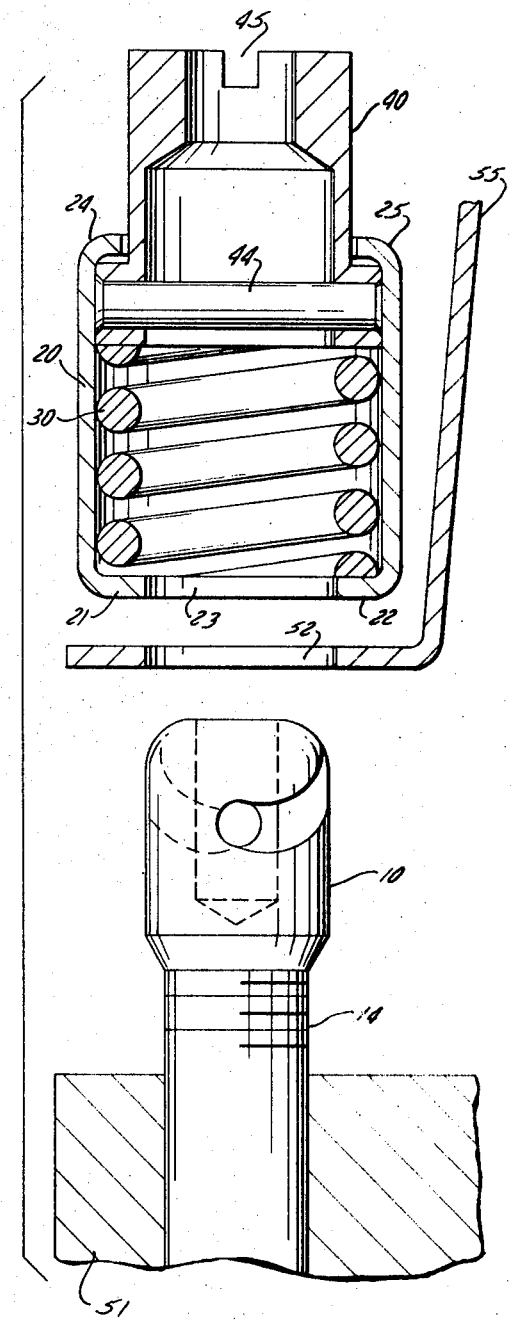
FIG. 4 is an exploded vertical sectional view showing the fastener element and assembly with the valve cover uncoupled from the engine block.

FIG. 2 shows the fastener element and assembly coupling valve cover 50 to engine block 51 provided with combustion cylinders 53 and 54. FIG. 4 shows the fastener element and valve cover uncoupled. Shank 10 is mounted in engine block 51 by means of thread 14. Coil spring 30 is fully extended so that housing 40 is moved upwardly in sleeve 20 into engagement with shoulders 24 and 25. Housing 40 is provided with a tool-engagable surface such as kerf 45 to accommodate a screw driver blade or other tool for use in urging housing 40 downwardly and axially rotating the fastener element to cause pin 44 to rotate through an angle of 90° and move into engagement with cam slot 11. Since the fastener element may be uncoupled from shank 10 by a quarter turn rotation (i.e. through 90°) considerable time is saved in removing the valve cover from the engine block. Shank 10 extends upwardly from engine block 51 and serves to align the sealing gasket (not shown) by projecting through spaced apertures in the gasket.

Figure 3:
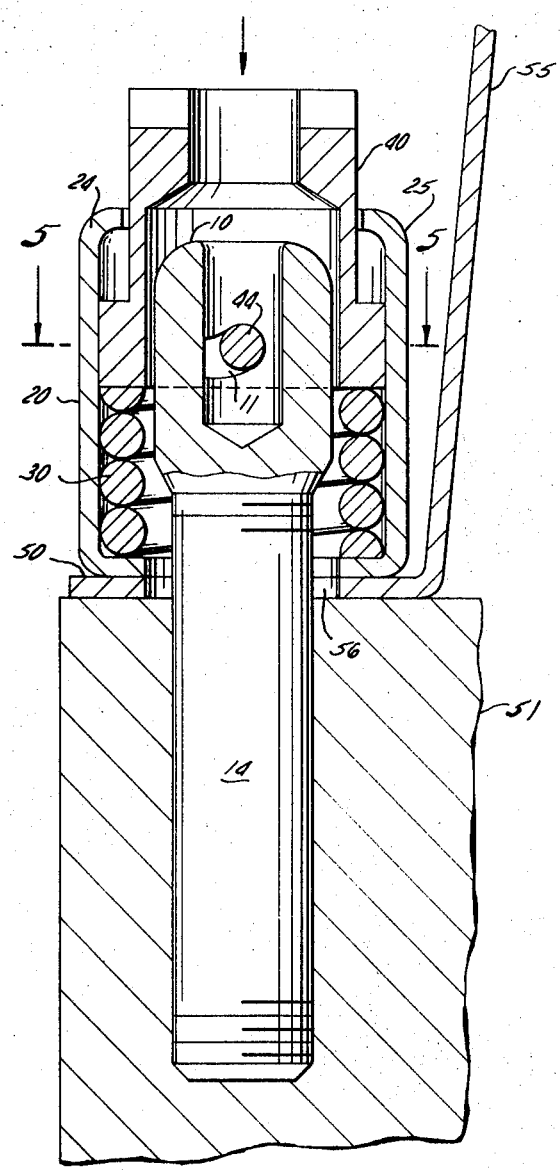
FIG. 3 is a vertical sectional view taken along the line 3—3 of FIG. 2.

FIG. 3 shows valve cover 50 having aperture 56 and upward extension 55 (shown only in fragment) coupled to engine block 51 by means of the fastener assembly. Sleeve 20 is positioned about shank 10 and housing 40 compressively engages coil spring 30 so that pin 44 is positioned in cam slot 11 of shank 10. Spring 30 is compressively engaged by housing 40 and exerts an upward force on the housing which serves to lock pin 44 in slot 11 and otherwise prevent unintentional rotation of the fastener element. To remove valve cover 50 from engine block 51, housing 40 is urged downwardly from the position shown in FIG. 3 and rotated counterclockwise (looking downwardly in the direction of the arrow of FIG. 3) through an angle of 90°.

Figure 6:
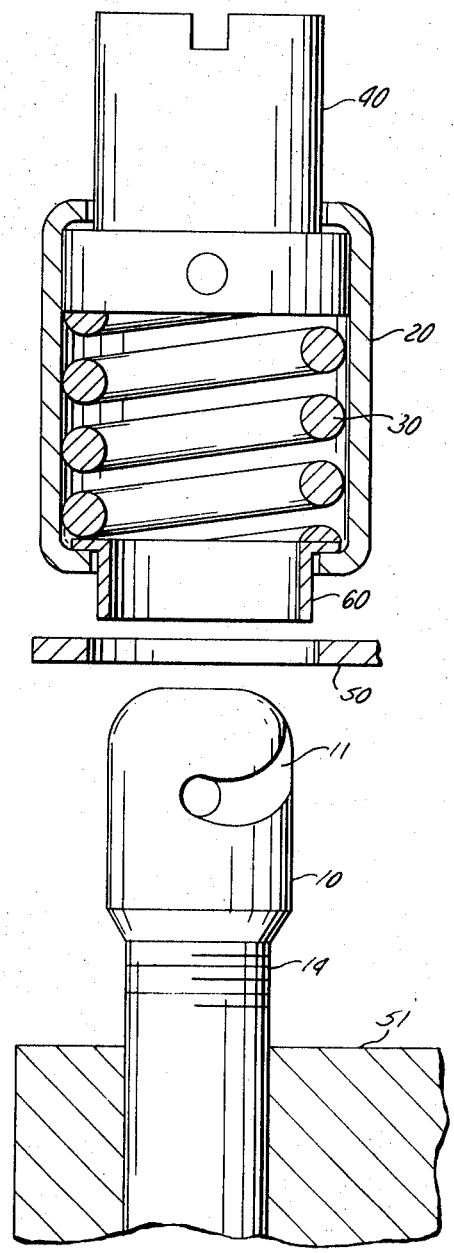
FIG. 6 is an exploded view of the fastener assembly and grommet.
Figure 7:
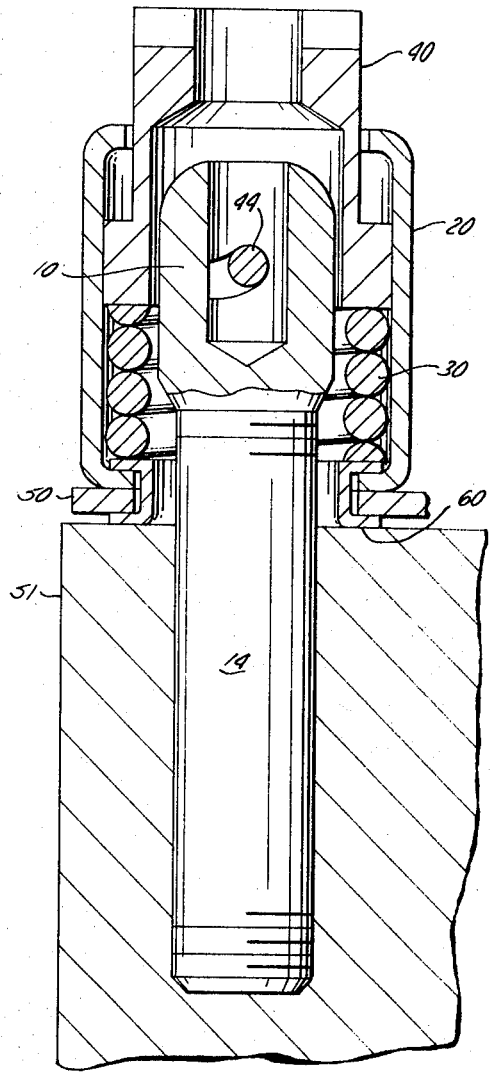
FIG. 7 is a sectional view of the fastener assembly and grommet coupled to the valve cover.

FIG. 6 shows the fastener assembly with grommet 60 extending from sleeve 20. Grommet 60 serves to attach sleeve 20 to valve cover 50 as shown in FIG. 7. This can be achieved by the use of a flaring tool to force the side walls of grommet 60 outwardly to form a flange upon which valve cover 50 sits. This arrangement permits the fastener element to be held captive to valve cover 50.

The fastener element and assembly are especially adaptable for use in joining panels or members where accessability is a problem since the members can be coupled or uncoupled by a quarter turn of the fastener element. The fastener element and assembly are also useful in conjunction with heavy machine castings and can serve to join guard rails and/or other members to the casting.

It should be kept in mind that although the embodiment described in detail above in connection with the drawings employs a stud shank which contains a spiral cam slot adapted to receive the pin which is mounted in the housing to perform the coupling function, it is contemplated that the location of the pin and the spiral cam slot could be reversed. In that particular arrangement, the spiral cam slot would be located in the housing and the pin would be mounted on the stud shank. Thereafter, to couple the elements together it would only be necessary to extend the stud shank into the housing until the pin is properly positioned with respect to the cam slot so that upon proper rotation the coupling function will be performed as described above. This particular embodiment is an alternative to the preferred embodiment described in detail above.

Although the present invention has been described in conjunction with preferred embodiments, such, for example, as in detachably fastening a valve cover to an engine block, it is to be understood that modifications and variations may be resorted to without departing from the spirit and scope of the invention as those skilled in the art will readily understand.

I claim:

1. A fastener element assembly which comprises:
 a stud shank member;

a sleeve;
a rotatable housing member movably positioned in the sleeve;
one of said members having surfaces thereon forming a spiral cam slot;
a pin extending diametrically across the other of said members and being supported thereby,
said stud shank member being receivable in said housing member so that said pin and spiral cam slot are in engageable position;
manipulative means on said housing member for rotating said housing member; and
a spring mounted in the sleeve and abutting the housing so that when the sleeve is positioned about the stud shank member and the housing member compressively engages the spring while the housing member is axially rotated, the position of the pin in the cam slot will be shifted to couple the fastener element and shank together.

2. In an internal combustion engine of the type having an engine block and a valve cover provided with a plurality of apertures, the improvement in combination therewith which comprises:
a stud shank member mounted in the engine block and extending through a valve aperture;
a sleeve for engagement of the valve cover;
a rotatable housing member movably positioned in the sleeve;
one of said members having surfaces thereon forming a spiral cam slot;
a pin extending diametrically across the other of said members and being supported thereby,
said stud shank member being receivable in said housing member so that said pin and spiral cam slot are in engageable position;
manipulative means on said housing member for rotating said housing member; and
a spring mounted in the sleeve and abutting the housing so that when the sleeve is positioned about the stud shank member and the housing member axially rotated while compressively engaging the spring, the position of the pin within the cam slot will be shifted to force the sleeve and valve cover into pressing engagement and thereby couple the valve cover to the engine block.

3. A fastener element adaptable for use with a stud shank having a spiral cam slot disposed in the shank wall, said fastener element comprising:
a sleeve;
a rotatable housing movably positioned in the sleeve;
a pin extending diametrically across the housing and supported thereby; and
manipulative means on said housing for rotating said housing; and
a spring mounted in the sleeve and abutting housing, so that when the sleeve is positioned about the stud shank and the housing compressively engages the spring while the fastener element is axially rotated, the pin will move into the cam slot to couple the fastener element and shank together.

4. A fastener element in accordance with claim 3 including means for attaching the sleeve to a member to be fastened to thereby hold the fastener element captive.

5. A fastener element in accordance with claim 4 wherein the attaching means comprises a grommet.

6. A fastener element in accordance with claim 2 wherein the sleeve is provided with a shoulder against which the spring is compressively engaged by the housing member.

7. A fastener element in accordance with claim 6 wherein said manipulative means comprises a tool-engagable surface to permit axial rotation of the fastener element.

8. A fastener element assembly which comprises:
a stud shank provided with a spiral cam slot disposed in the shank wall;
a sleeve;
a rotatable housing movably positioned in the sleeve;
a pin extending diametrically across the housing and supported thereby,
manipulative means on said housing for rotating said housing; and
a spring mounted in the sleeve and abutting the housing, so that when the sleeve is positioned about the stud shank and the housing compressively engages the spring while the fastener element is axially rotated, the pin will move into the cam slot to couple the fastener element and shank together.

9. A fastener element in accordance with claim 8 including means for attaching the sleeve to a member to be fastened to thereby hold the fastener element captive.

10. A fastener element in accordance with claim 9 wherein the attaching means comprises a grommet.

11. A fastener element in accordance with claim 8 wherein the sleeve is provided with a shoulder against which the spring is compressively engaged by the housing.

12. A fastener element in accordance with claim 11 wherein said manipulative means comprises a tool-engagable surface to permit axial rotation of the fastener element.

13. In an internal combustible engine of the type having an engine block and a valve cover provided with a plurality of apertures, the improvement in combination therewith which comprises:
a stud shank mounted in the engine block and extending through a valve aperture, said shank having a spiral cam slot disposed in the shank wall;
a sleeve for engagement of the valve cover;
a rotatable housing movably positioned in the sleeve;
a pin extending diametrically diagonally across the housing and supported thereby,
manipulative means on said housing for rotating said housing; and
a spring mounted in the sleeve and abutting the housing, so that when the sleeve is positioned about the stud shank and the housing axially rotated while compressively engaging the spring, the pin will move into the cam slot to force the sleeve and valve cover into pressing engagement and thereby couple the valve cover to the engine block.

14. A fastener element in accordance with claim 13 wherein said manipulative means comprises a tool-engagable surface to permit axial rotation.

15. A fastener element in accordance with claim 13 including means for attaching the sleeve to the valve cover so that the fastener element is held captive to the valve cover.

16. A fastener element in accordance with claim 15 wherein the attaching means comprises a grommet.

* * * * *